United States Patent [19]
Valentine

[11] 3,864,849
[45] Feb. 11, 1975

[54] EDUCATIONAL DEVICE FOR LEARNING IGNITION SYSTEM FUNDAMENTALS

[75] Inventor: Charles G. Valentine, Stamford, Conn.

[73] Assignee: Xerox Corporation, Stamford, Conn.

[22] Filed: Oct. 12, 1973

[21] Appl. No.: 405,972

Related U.S. Application Data

[63] Continuation-in-part of Ser. No. 345,920, March 29, 1973.

[52] U.S. Cl. .................. 35/13, 35/7 A, 35/19 A
[51] Int. Cl. ............................. G09b 25/02
[58] Field of Search ............. 35/7 A, 8 R, 8 A, 9 R, 35/9 A, 9 B, 9 C, 10, 11, 13, 19 R, 19 A, 28, 30 R, 48 R, 54; 40/142 A

[56] References Cited
UNITED STATES PATENTS

| | | | |
|---|---|---|---|
| 3,077,696 | 2/1963 | Barnett et al. | 35/19 A |
| 3,245,156 | 4/1966 | De Bloois et al. | 35/8 A |
| 3,278,736 | 10/1966 | Pastoriza | 235/184 |
| 3,330,053 | 7/1967 | Hendrix | 35/30 |
| 3,357,114 | 12/1967 | Green | 35/13 |
| 3,423,846 | 1/1969 | Arend | 35/19 A |
| 3,510,963 | 5/1970 | Zbar et al. | 35/19 A |
| 3,514,873 | 6/1970 | Stobbe | 35/7 A X |
| 3,654,711 | 4/1972 | Taylor | 35/7 A X |

Primary Examiner—Robert W. Michell
Assistant Examiner—Vance Y. Hum

[57] ABSTRACT

An educational kit for teaching the operation and mechanism of automotive ignition system is disclosed. The kit comprises an audiovisual instructional means, a simulator board upon which is graphically depicted indicia representing a schematic diagram of various component parts of an automotive ignition system as well as a plurality of jack members used for forming electrical connections between these simulated component parts, and a plurality of manipulative pieces upon which are graphically depicted schematic diagrams of various of the electrical components of the ignition system. The kit also includes a plurality of male plug wires used to form simulated electrical connections. The pieces are adapted to be positioned on the simulator board and used in conjunction therewith such that the user of the kit may graphically depict the assembly, relationship of parts, and operation of an automotive ignition system.

8 Claims, 10 Drawing Figures

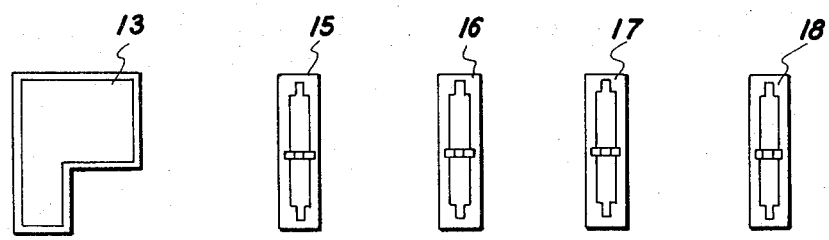
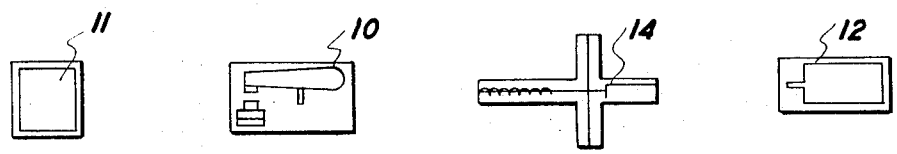
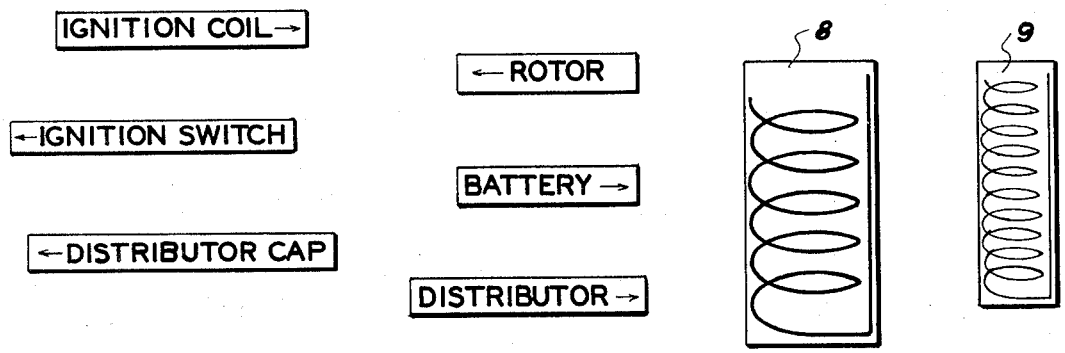
FIG. 6

AUDIO VISUAL MEANS

WORK SHEETS

EDUCATIONAL DEVICE FOR LEARNING IGNITION SYSTEM FUNDAMENTALS

This application is a continuation-in-part of applicant's copending application Ser. No. 345920, filed Mar. 29, 1973.

BACKGROUND OF THE INVENTION

The present invention relates to a portable, compact and easily assembled educational kit. More specifically, the present invention is directed towards an educational kit for teaching the assembly, relationship of parts and operation of an automotive ignition system comprising as the essential components thereof an audiovisual instructional means, a simulator board bearing graphic indicia and jack members thereon, a plurality of manipulative pieces bearing graphic indicia thereon, which indicia is relatable to the indicia present on the simulator board, and a plurality of plug wires such that the student can demonstrate his understanding of the fundamentals of the ignition system by arranging certain of the manipulative pieces and plug wires on the board in a logical sequence.

A problem of increasing difficulty in the education field is that of providing a relatively simple means for instructing students, whether in the classical elementary or high school subjects, or in the various occupational technologies. The effectiveness of the traditional method of teaching involving the teacher/textbook/student relationship is measured not so much by the qualitative aspects of the information conveyed, but rather by how much of the information conveyed is absorbed, understood and learned by the particular student. In recent years the trend in education has witnessed the introduction of a number of educational teaching devices generally aimed at the pre-college or pre-high school age group. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few educational devices available in the community colleges, the junior colleges, the vocational high schools, the trade schools and other special schools where various types of occupational technologies are sought to be taught on a simplified and individualized basis.

Accordingly, it is an object of this invention to provide programmed educational kits which present information using a multimedia approach.

Another object is to provide an educational kit comprising instructional means and simulator means for teaching the assembly, relationship of parts and operation of an automotive ignition system.

Another object is to provide an educational kit which is simple, relatively inexpensive, rugged, easily assembled, relatively portable and easily understood.

Another object is to provide an educational kit designed for use by individual students comprising audio, visual or audiovisual instructional means, a simulator board bearing graphic indicia and a plurality of jack members thereon, a plurality of manipulative pieces bearing graphic indicia depicting schematic diagrams of various parts of an ignition system, or word indicia naming various parts of said system, and a plurality of plug wires whereby the student may position the pieces or wires at the appropriate respective indicia or jack members present on the simulator board in response to the instructional means to graphically depict the construction of an automotive ignition system and physically simulate the operation thereof.

SUMMARY OF THE INVENTION

In accordance with the objects and teachings of the present invention, a simple and effective educational kit or unit for the teaching of an automotive ignition system is provided. The unit comprises an instructional means, a simulator board upon which is graphically depicted indicia representing schematic diagrams of some of the component parts of an automotive ignition system and a plurality of jack members associated with these diagrams, and a plurality of pieces upon which are graphically depicted schematic diagrams of various component parts or sub component parts of an ignition system or certain descriptive word indicia. Also included in the kit are a plurality of wires having double ended male plug leads which are used in conjunction with the jack members on the simulator board to form simulated electrical connections between the component parts depicted on the board. The kit may also comprise a display board which provides for storage and easy access to the various pieces when the kit is in use. The kit is designed to present the fundamentals of the automotive ignition system whereby the student learns the assembly, relationship of parts and operation of said system. This information is conveyed to the student using a programmed multimedia approach whereby the student hears and sees information, performs by answering questions, solving problems and manipulating objects. The kit is designed for individual use or for use by small groups without the need for extensive supervision or participation by an instructor. It permits the student to learn at his own pace and also affords him the chance to capitalize on the way he learns best because he participates in different kinds of learning experiences. He listens to information while viewing a series of related visuals and participates in a manipulative activity which gives him the chance to try doing himself what he has been shown or told how to do. Each time a student learns something new, he responds to this new knowledge or skill to make sure he has learned it correctly. First, he performs an activity such as answering a question, solving a problem or manipulating a device. Then he finds out immediately if the action is correct by comparing the result of this action with the one provided by the program. If the student finds that his answer is correct, this instant feedback and learning reinforcement motivates him to continue learning. If he discovers that his answer is wrong or inadequate, he can stop at that point and find out where his error is.

DETAILED DESCRIPTION OF THE INVENTION

Various kinds of instructional means can be employed with the educational kit of this invention. For example, one of the preferred instruction means is an audiovisual presentation using slides or filmstrips in conjunction with a descriptive audio account of the visuals, presented by means of tapes or audio cassettes. A recorded narrator provides background information relating automotive ignition system including the parts thereof, how the system operates, and how the various parts are connected. During this audio presentation, a series of synchronized related visuals are shown to the students. These visuals comprise photographs or diagrams of the various ignition system parts, how they are assembled, and how they are connected.

The audiovisual equipment needed will vary depending on the type of instruction to be given. A rear screen projector for small groups, or a projector and a screen for a classroom presentation may be used. For the audio presentation, either visual projection equipment with built-in audio capability or a separate cassette recorded may be used. The instructional means provided with the educational kit includes a visual segment available, for example, on 35 mm slides or filmstrips, and an audio segment available on cassettes. The supporting equipment is normally not included with the kit.

At various points during the presentation, the student is requested to stop the audiovisual presentation and perform certain activities using the simulator board and pieces associated therewith. For example, he may be requested to position pieces depicting the distributor points, condenser or rotor at the appropriate places within the diagram of the distributor present on the simulator board, or make the appropriate electrical connections between the various parts depicted on the board using plug-in wires, and label the various components so placed using other pieces bearing indicia naming these parts. The simulator activity thus allows the student to use his hands as a learning tool, as well as his eyes and ears. By performing an activity using the simulator board and its accessories, the learning process is reinforced and the student takes an active part in learning and achieves understanding more quickly.

The simulator board and the accessories are best described with reference to the attached drawings.

BRIEF DESCRIPTION OF THE DRAWINGS

FIG. 6 is a plan view of the manipulative pieces having graphic indicia thereon.

DETAILED DESCRIPTION OF THE DRAWINGS

Figure 1:
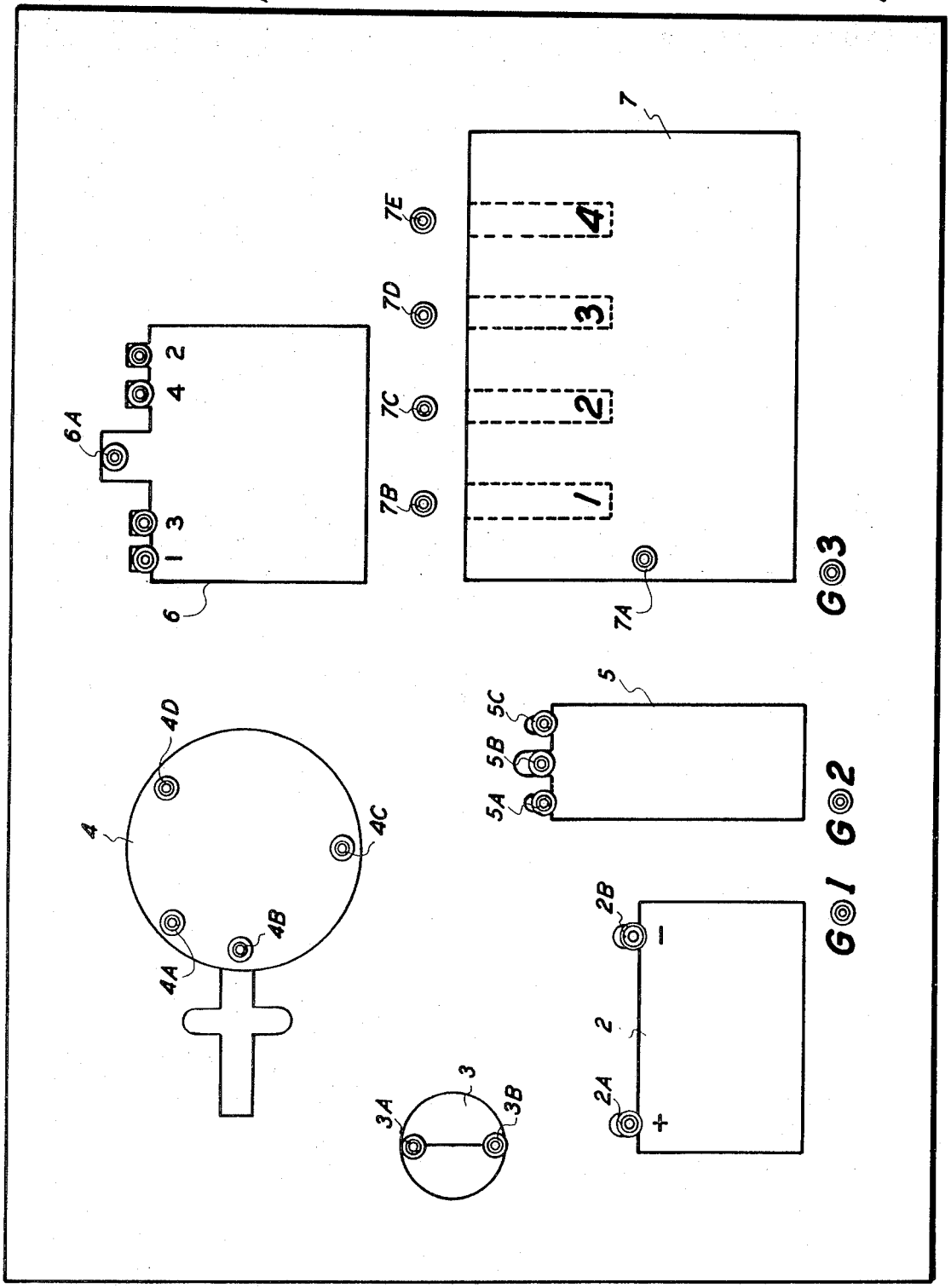
FIG. 1 is a plan view of the simulator board with graphic indicia thereon.

In FIG. 1 the simulator board 1 is shown having printed thereon graphic indicia depicting schematic outlines of an automobile battery 2, an ignition switch 3, a distributor 4, a coil 5, a distributor cap 6 and indicia representative of a four cylinder engine block 7. Also present mounted on the board are a plurality of female jack leads shown in FIG. 1 as small concentric circles. These jack leads serve as locations for forming and simulating electrical connections between the various ignition system components, or between various of the components and ground, using male plug wires as will be hereinafter disclosed. Three jacks simulating ground are shown at the base of the board adjacent the indicia G1, G2, and G3, which indicia is printed on the board. Jacks 2A and 2B are associated with battery 2, jacks 3A and 3B with ignition switch 3, jacks 4A, 4B, 4C and 4D with distributor 4, and jacks 5A, 5B and 5C with coil 5. Five jacks are associated with distributor cap 6, namely a central jack designated 6A and four other jacks adjacent indicia 1, 3, 4 and 2 which indicia is printed on the simulator board. Five jacks are also associated with indicia 7 representing an engine block, namely 7A, 7B, 7C, 7D and 7E. The numerals 1, 2, 3 and 4 are printed on the board and shown within engine block 7 to represent the four cylinders of the engine.

The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of metal, it may be laminated to a suitable backing member to impart suitable rigidity thereto. Thus, the simulator board may comprise a thin sheet comprising ferrous metal having a thickness of about one thirty-second inch laminated to a backing member made from a rigid material such as masonite, fiberboard, or a resinous material, said backing material having a preferred thickness of about one-fourth inch. The dimensions of the simulator board should be such that the board can be conveniently used by the student at a given workplace. Boards having dimensions of about 15 × 20 inches, or approximately 300 square inches, are particularly suitable.

Figure 2:
FIG. 2 is right side view of the simulator board.

FIG. 2 shows a right hand side plan view of simulator board 1 of FIG. 1 with jack leads mounted thereon.

Figure 3:
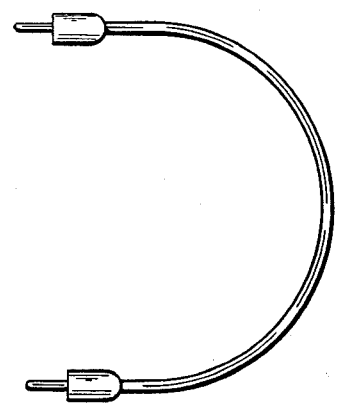
FIGS. 3 and 4 are plan views of several male plug leads of different sizes used in conjunction with the simulator board.
Figure 4:
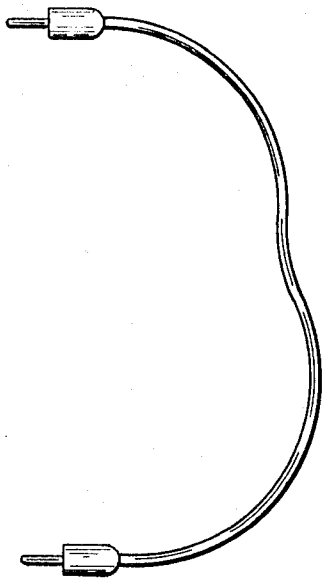

FIGS. 3 and 4 show two male plug leads representative of 12 of such leads included in the kit. The 12 leads range in various sizes from about 6 to 12 inches in length.

Figure 5:
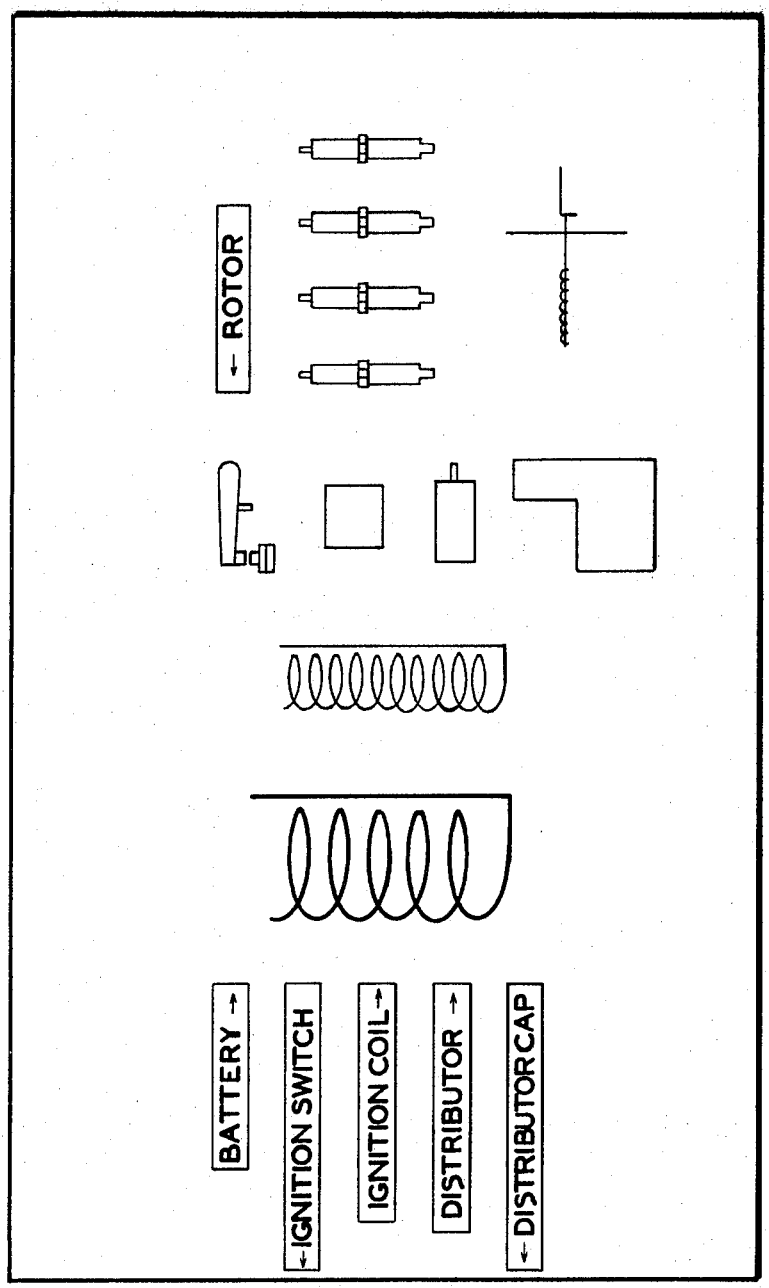
FIG. 5 is a plan view of the display board with graphic indicia thereon.

In FIG. 5 a display board is shown having printed thereon graphic indicia depicting various parts for an automotive ignition system and certain descriptive word indicia. The display board is also constructed on a magnetically attractive material similar to the simulator board and the background indicia may be printed thereon in the same way. The purpose of the display board is to serve as a display and storage area for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

The manipulative pieces used in the educational kit of this invention are shown in FIG. 6. Each of these pieces is made of a flat sheet of a rigid material such as metal or plastic and has laminated to the underside thereof smaller pieces of a magnetically attractive material such as metal or ferrite plastic. The preferred thickness of the pieces is approximately one-sixteenth of an inch and the thickness of the smaller section laminated to the underside of the pieces is about three thirty-seconds of an inch.

As shown in FIG. 6 some of the pieces bear indicia depicting schematic diagrams of various of the component parts of an automotive ignition system and other of the pieces bear word indicia. Piece 8 depicts a primary coil winding, piece 9 depicts a secondary coil winding, piece 10 represents breaker points, piece 11 represents a distributor cam, piece 12 depicts a condenser, piece 13 depicts a distributor rotor, piece 14 represents a vacuum spark advance system and pieces 15 – 18 represent automotive spark plugs. Six pieces bearing descriptive word indicia or labels and a directional arrow are shown; these include the indicia BATTERY, IGNITION SWITCH, IGNITION COIL, DISTRIBUTOR, ROTOR AND DISTRIBUTOR CAP.

Piece 8 through 18 and the labels are adapted for use in response to the audio-visual instructional means and in conjunction with the indicia present on simulator board 1 such that the student may simulate the construction of the sub component parts associated with the component parts of the ignition system depicted on the board. For example, the construction and operation of the distributor is simulated by placing pieces 10, 11, 12 and 14 at the appropriate location within the distributor depicted at 4 on the simulator board. The operation of the system is further defined using the male plug leads to connect various of the components depicted on the simulator board in the proper operational sequence, as will be hereinafter defined.

Figure 7:
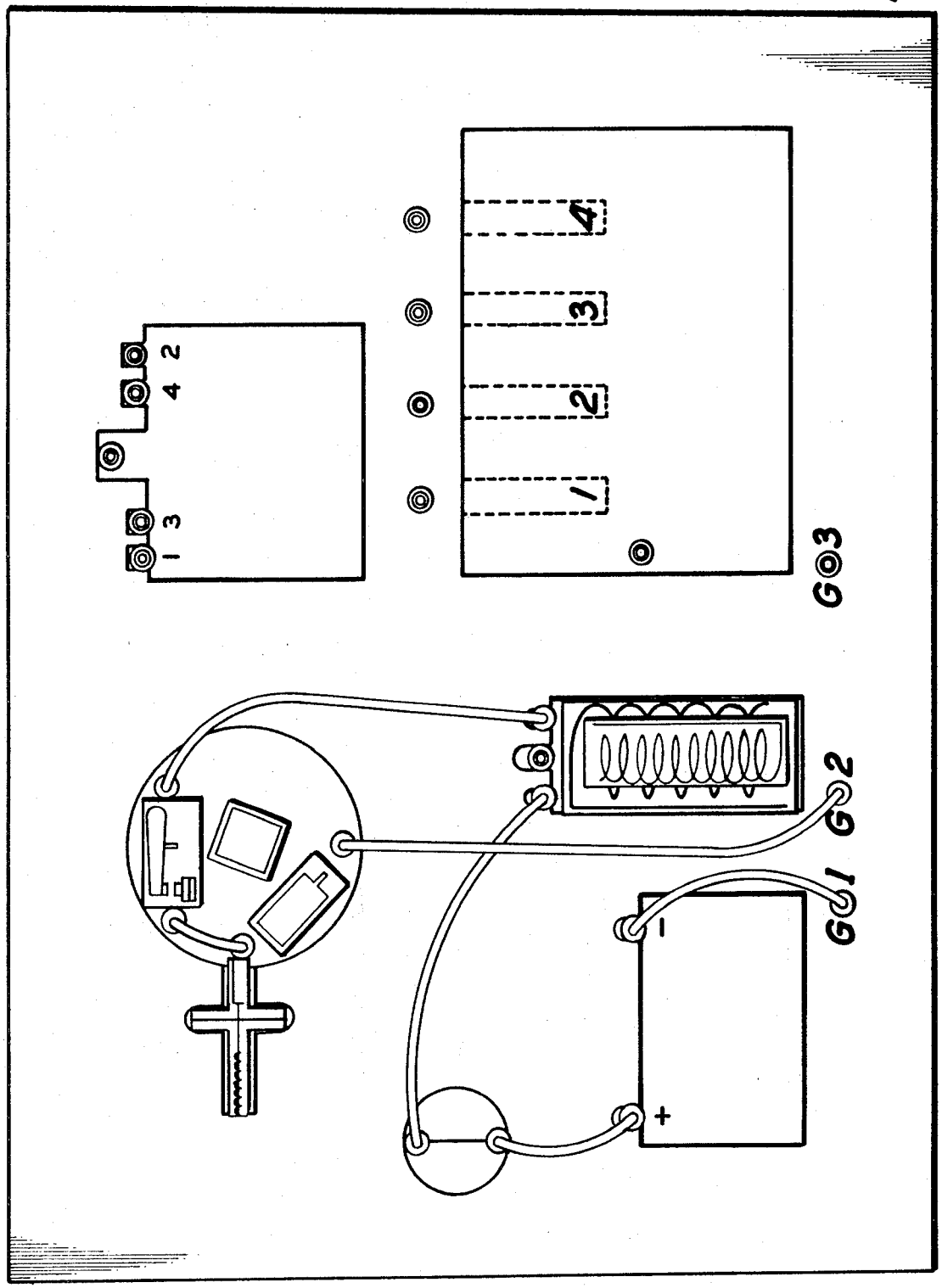
FIG. 7 is a plan view of the simulator board with certain of the manipulative pieces and plug leads in place.
Figure 8:
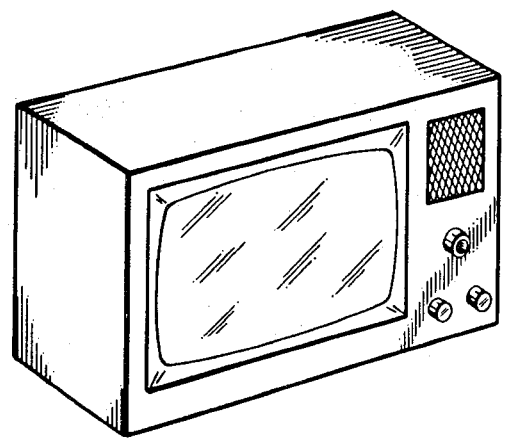
FIG. 8 depicts generally an audio/visual device suitable for use in the present invention.
Figure 9:
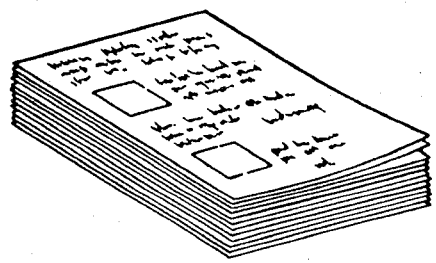
FIG. 9 illustrates suitable worksheets.
Figure 10:
FIG. 10 is a side sectioned view of a typical manipulative piece showing small magnetic sections laminated to the underside of the piece.

In FIG. 7, the simulator board is shown with certain of the manipulative pieces and male plug wires in place. Primary and secondary coil windings 8 and 9 are shown in place within 5, and the major components of the distributor, namely pieces 10 – 12 and 14 are shown in place within 4. Plug leads are shown properly positioned to depict the operational circuit of the system.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need only be of a material that is attracted to a magnet. In the simpler and preferred embodiment, the bases of the pieces have laminated thereto a section of a magnetic material such as magnetic plastic or metal, and the boards are made of material that is attractive to a magnet such as galvanized steel. The female jacks present on the simulator board are mounted by drilling holes at the appropriate places and fastening them through the board at the back.

All of the above materials are most conveniently supplied housed in a compartmentalized case for easy use and storage. Thus, the educational kit includes the simulator board, the display board, the manipulative pieces, the plug leads, the visual slides or tapes and the audio cassette. The kit may also include student work sheets, sample tests or quizzes to be given by the instructor before and after use of the unit, and an instructor's manual.

To illustrate how the educational kit of the present invention is used, the audio-visual presentation begins with a discussion of the ignition system including a brief discussion of the function of the system and a detailed discussion of each of the major component parts of the system. The student is informed that the ignition system is made up of two circuits: a primary circuit and a secondary circuit. The primary circuit delivers pulses of low voltage electricity to the ignition coil, which transforms these pulses into extremely high voltage needed to create a spark in the spark plugs. The student is informed that the step-up in voltage from 12 volts to 20,000 volts or more is accomplished by the ignition coil. The construction of the coil is examined in detail. The student may simulate this construction by positioning piece 8 which depicts a primary coil winding on the simulator board within the outline of the ignition coil shown at 5 on the simulator board and by subsequently superimposing piece 9 over piece 8 to depict the secondary coil winding.

In this fashion then, each of the major components of the automotive ignition system are in turn discussed, including the battery, the ignition switch, the coil, the distributor, the distributor cap, as well as how these components work together to provide a high voltage spark to the spark plugs in the proper sequence. As each component is discussed, the student is instructed to turn to the simulator board and label the appropriate component depicted on the board using the pieces bearing the descriptive word indicia contained in the kit. For example, the student is instructed to first label the battery, the ignition switch, and the ignition coil. The instructional material then discloses the function of each of these elements and how they are appropriately wired. The student is able to simulate the wiring using the plug leads by plugging them into the appropriate jack members present on the board. The circuit between the battery, ignition switch, and ignition coil is formed by first connecting one plug lead of appropriate size to the negative terminal of the battery at 2B and to the ground designated G1. This simulates the grounding of the negative terminal of the battery to the automobile frame. Next, a circuit is formed between jack 2A on the battery and jack 3B on the ignition switch. Next, the circuit between the ignition switch and the coil is formed by connecting a plug lead between jack 3A and jack 5A.

The audio-visual instructional means next deals with the role of the distributor and includes a detailed discussion of the major component parts of the distributor such as the points, the condenser, and the cam. The student is once again instructed to return to the simulator board, label the distributor, and position the appropriate pieces representing the points, the condenser, and the rotor at the proper positions within indicia 4 on the simulator board. The wiring between the coil and the distributor is simulated by connecting jacks 5C and 4D. This then simulates the connection between the coil and the right side of the breaker points. After the role of the condenser in the ignition system is discussed, the connection between the left side of the breaker points and the condenser is simulated by using a plug wire to connect jacks 4A and 4B. To complete the path for the primary voltage, the distributor is also connected to ground so that the voltage can be returned to the battery. Although there is no real wire connecting the distributor to ground since this is accomplished by physical connection of the distributor to the automobile frame, the ground is nonetheless depicted by connecting jack 4C and the jack at G2 shown on the simulator board. At this point then, the student has traced the entire path of the primary voltage from its source to ground and back to the battery. Proper positioning of the pieces and wires for this configuration is shown in FIG. 7.

The instructional material next deals with an examination of the secondary voltage path and the way a spark is delivered to the proper cylinder at the proper time for combustion. This begins with a discussion of the distributor and the method by which voltage is selectively supplied to the spark plugs by means of the rotor and the various terminals associated with the distributor cap. The operation of the rotor in an ignition system for a four-cylinder engine can be simulated by positioning piece 13, which depicts a rotor, within indicia 6 present on the simulator board, which represents a distributor cap. The transfer of high voltage from the coil to the distributor cap can be depicted by connecting jack 5B associated with the coil shown at 5 on the simulator board and jack 6A which represents the center terminal on the distributor cap which is directly connected to the rotor. The instructional material then discusses the method by which the high voltage is transferred to each of the terminals in the distributor cap which are in turn connected with one of the spark plugs mounted on the engine block. The method by which the distributor shaft is driven is discussed and the relationship between the rotation of the shaft and the rotor and the firing of each cylinder at the proper point in time is explored. The student may construct the wiring between the distributor cap and the spark plugs by positioning pieces 14, 15, 16 and 17 which represent spark plugs over the numerical indicia 1, 2, 3, and 4 shown within indicia 7 on simulator board 1. The proper wiring between the various distributor terminals and the spark plugs may be simulated by connecting the numbered jacks shown within indicia 6 on the board with the corresponding appropriate number shown within indicia 7. For example, jack 1 shown at indicia 6 should be connected with jack 7B; jack 3 of 6 should be connected with jack 7D; jack 4 of 6 should be connected with jack 7E; and jack 2 of 6 should be connected with jack 7C. In this manner then, the student is able to simulate the high voltage connection between the coil and the distributor cap and further simulate the means by which the high voltage is distributed to each one of the spark plugs located in the engine block. The complete circuit returning to the battery is made, of course, through the engine block which is grounded to the frame. This final ground can be depicted by connecting terminal 7A to ground G3 shown on the simulator board.

The instructional material next gets into a discussion of spark timing. By this is meant that the high voltage spark must be supplied to the spark plug at the proper time if the engine is to perform satisfactorily. When the engine is idling, the proper time for combustion would be slightly after the piston has reached the top of its compression stroke. At higher speeds, however, the timing of the spark must be significantly ahead of the time when the piston reaches top dead center if appropriate combustion is to occur at the proper time. This timing variable is accounted for by including a device which will advance the spark as a function of engine speed. The most popular types of spark advance system, namely, the vacuum and centrifical advance mechanisms, are discussed and their method of operation is explored. Piece 18 depicts a vacuum advance mechanism which may be simulated by positioning this piece at the appropriate place within indicia 4 present on simulator board 1.

The above described educational kit thus provides the student with the opportunity of exploring concepts involved in the operation of an automotive ignition system by simulating the construction and arrangement of parts involved in such a system. The educational kit is programmed such that the student will encounter a minimum of frustration and a maximum of learning efficiency during use of the kit. Upon completion of the kit, the student should be able to state the two functions of an automotive ignition system; identify principal components of the primary and secondary circuits of an ignition system; state the voltage requirements of the primary and secondary ignition circuits; match each principal ignition system component with its function; name two commonly used spark advance mechanisms; explain how proper spark timing is determined; and the like.

A complete description of the educational kit encompassed by the present invention may be found in a booklet entitled "Automotive Technology - Ignition System Fundamentals" (Unit 10209–80) published as part of the Occupational Technology Series by the Xerox Corporation.

What is claimed is:

1. An educational kit for teaching the assembly, relationship of parts, and operation of an automotive ignition system comprising:

a. a simulator board having a surface of magnetically attractive material and including graphic indicia on the surface thereof defining schematic diagrams of the outlines of various of the component parts of an automotive ignition system in its unconnected state, said board further having mounted thereon in association with said indicia a plurality of jack members for forming simulated electrical connections between various of said schematic diagrams;

b. a plurality of magnetically attractive manipulative pieces individually bearing on their surfaces specific graphic indicia defining specific elements of the component parts for an automotive ignition system or descriptive word indicia;

c. a plurality of plug wires each adapted for connecting two of said jack members; and d. audiovisual instructional means; said manipulative pieces and plug wires adapted for manipulation on the simulator board and in association with the simulator board indicia by the user in response to said instructional means such that the assembly, relationship of parts, and operation of an automotive ignition system can be graphically and physically simulated, said magnetically attractive board or alternatively each of said magnetically attractive pieces being magnetic to provide a mutual attraction between said board and said pieces.

2. An educational kit according to claim 1 further comprising a display board for said manipulative pieces including a sheet of magnetically attractive material, said manipulative pieces adapted for storage on and removal from said display board.

3. An educational kit according to claim 1 wherein said manipulative pieces are magnetic.

4. An educational kit according to claim 3 wherein said manipulative pieces comprise flat sheets of rigid material having smaller sections of a magnetic material laminated thereto.

5. An educational kit according to claim 1 wherein the indicia depicted on said simulator board comprises schematic diagrams of an automotive battery, ignition switch, distributor, coil, distributor cap and engine block.

6. An educational kit according to claim 1 wherein said audio instruction means includes tape recordings which are synchronized with said visual instruction means which includes slides or filmstrips.

7. An educational kit according to claim 1 wherein said instruction means includes a plurality of student work sheets, said work sheets being adapted for use by the student to record information and test the student in response to said audiovisual instruction means.

8. An educational kit according to claim 2 wherein said simulator board, said manipulative pieces, and said display board are constructed of a substantially rigid material.

* * * * *